(12) United States Patent
Wang (10) Patent No.: US 11,929,659 B2
(45) Date of Patent: Mar. 12, 2024

(54) VOICE COIL MOTOR BASE, AND VOICE COIL MOTOR AND CAMERA MODULE COMPRISING THE SAME

(71) Applicant: New Shicoh Motor Co., Ltd, Zhejiang (CN)

(72) Inventor: Dongming Wang, Zhejiang (CN)

(73) Assignee: New Shicoh Motor Co., Ltd, Zhejiang (CN)

( * ) Notice: Subject to any disclaimer, the term of this patent is extended or adjusted under 35 U.S.C. 154(b) by 257 days.

(21) Appl. No.: 17/612,577

(22) PCT Filed: Jul. 23, 2020

(86) PCT No.: PCT/CN2020/103696
§ 371 (c)(1),
(2) Date: Nov. 19, 2021

(87) PCT Pub. No.: WO2021/164197
PCT Pub. Date: Aug. 26, 2021

(65) Prior Publication Data
US 2022/0239186 A1  Jul. 28, 2022

(30) Foreign Application Priority Data

Feb. 19, 2020 (CN) .......................... 202010102067.1

(51) Int. Cl.
*H02K 5/22* (2006.01)
*H02K 41/035* (2006.01)
(Continued)

(52) U.S. Cl.
CPC ......... *H02K 5/225* (2013.01); *H02K 41/0356* (2013.01); *H04N 23/54* (2023.01); *H04N 23/51* (2023.01)

(58) Field of Classification Search
CPC .... H02K 5/225; H02K 41/0356; H02K 33/18; H02K 5/22; H02K 2211/03; H04N 23/54; H04N 23/51; H04N 23/50
See application file for complete search history.

(56) References Cited

U.S. PATENT DOCUMENTS 9,241,097 B1 * 1/2016 Tam .................. H01L 27/14618
2002/0197179 A1 * 12/2002 Billiet ................. H01F 41/0266
419/10

(Continued)

FOREIGN PATENT DOCUMENTS

CN          106331449         1/2017
CN          107529700         1/2018
(Continued)

OTHER PUBLICATIONS

"International Search Report (Form PCT/ISA/210) of PCT/CN2020/103696", dated Oct. 28, 2020, with English translation thereof, pp. 1-4.

(Continued)

*Primary Examiner* — Gevell V Selby
(74) *Attorney, Agent, or Firm* — JCIP GLOBAL INC.

(57) ABSTRACT

Disclosed are a voice coil motor base, a voice coil motor provided with the voice coil motor base, and a camera module. The voice coil motor base includes a base body and two electrode terminals disposed on one side edge of the base body, and further includes a molding tape embedded in the base body. The molding tape is connected to the electrode terminals, the molding tape is provided with pins, and the pins connected to a circuit are disposed inside the voice coil motor.

8 Claims, 6 Drawing Sheets

(51) Int. Cl.
*H04N 23/51* (2023.01)
*H04N 23/54* (2023.01)

(56) References Cited

U.S. PATENT DOCUMENTS

2011/0157462 A1  6/2011 Huang
2018/0314076 A1* 11/2018 Park .................... G02B 27/646
2021/0026099 A1*  1/2021 Kim ..................... H04N 23/67

FOREIGN PATENT DOCUMENTS

| CN | 108173411 | 6/2018 |
| CN | 111163253 | 5/2020 |

OTHER PUBLICATIONS

"Written Opinion of the International Searching Authority (Form PCT/ISA/237) of PCT/ CN2020/103696", dated Oct. 28, 2020, pp. 1-5.

* cited by examiner

VOICE COIL MOTOR BASE, AND VOICE COIL MOTOR AND CAMERA MODULE COMPRISING THE SAME

CROSS-REFERENCE TO RELATED APPLICATION

This application is a 371 of international application of PCT application serial no. PCT/CN2020/103696, filed on Jul. 23, 2020 which claims the priority benefit of China application no. 202010102067.1, filed on Feb. 19, 2020. The entirety of each of the above mentioned patent applications is hereby incorporated by reference herein and made a part of this specification.

TECHNICAL FIELD

The present invention relates to the field of electronic equipment, in particular to a voice coil motor base, a voice coil motor using the voice coil motor base, and a camera module.

DESCRIPTION OF RELATED ART

The camera module is an important part of electronic equipment with camera function, such as a mobile phone or a tablet computer. The camera module generally includes a printed circuit board, an image sensor, a holder, a voice coil motor, and a lens. However, during the production of the base of the traditional voice coil motor, terminal connection leading-out pins are disposed on two sides of the motor, and after tapes are cut, the led-out pin are exposed to the outside and are connected to the circuit, thus there is a very high risk of short-circuiting between the pin and a housing.

SUMMARY

In light of the shortcomings in the prior art, the objective of the present invention is to provide a voice coil motor base to solve the above problems.

The technical problems solved by the present invention can be realized by adopting the following technical solutions.

A voice coil motor base includes a base body and two electrode terminals disposed on one side edge of the base body, and further includes a molding tape embedded in the base body. The molding tape is connected to the electrode terminals, the molding tape is provided with pins, and the pins connected to a circuit are disposed inside a voice coil motor.

Further, the pins are formed at joints of the molding tape and a scrap tape during processing.

Further, the electrode terminals are disposed perpendicular to the molding tape, one end of each of the electrode terminals are disposed in the base body, and the other end of each of the electrode terminals extends in a height direction of the base body and protrudes downward from the base body.

Further, the molding tape includes main tapes and auxiliary tapes connected to the scrap tape, and the pins led out after joints between the main tapes and the scrap tape are cut are disposed inside the voice coil motor and connected to the circuit.

Further, there are two main tapes respectively and symmetrically disposed on left and right sides in the base body, there are two auxiliary tapes respectively and symmetrically disposed on front and rear sides in the base body, and the two electrode terminals are respectively connected to the two main tapes. The scrap tape includes an outer ring scrap tape and an inner ring scrap tape, each of the main tapes and an adjacent one of the auxiliary tapes are connected by the inner ring scrap tape, a middle part of the base body is provided with a through hole, the inner ring scrap tape is disposed in the through hole, and the pins led out after joints between the main tapes and the inner ring scrap tape are cut are connected to the circuit. The outer ring scrap tape is disposed on an outer side of the base body, and outer sides of the auxiliary tapes are connected to the outer ring scrap tape.

Further, each of the main tapes includes a main tape body, and a first tape and a second tape that are connected to an inner side surface of the main tape body, an end of the first tape and an end of the second tape form the pins connected to the circuit, and the electrode terminal is integrally formed with an end of the main tape body. The auxiliary tape includes an auxiliary tape body, and a third tape and a fourth tape that are connected to the inner side surface of the auxiliary tape body. The first tape is connected to the third tape on a corresponding side, and the second tape is connected to the fourth tape on a corresponding side.

A voice coil motor includes the voice coil motor base described above.

A camera module includes the voice coil motor described above.

Compared with the prior art, the beneficial effects of the present invention are as follows.

The tapes are cut from the inside to the outside, the pins connected to the circuit are inside the voice coil motor, that is, the pins on the first tapes and the second tapes are inside the voice coil motor, and although the cut pins on the auxiliary tapes are outside the voice coil motor and are in contact with a housing, the auxiliary tapes are not charged; or the tapes and the electrode terminals are designed as separate structures, so the whole device is compact in structure and easy to process and assemble, and well avoids the risk of short-circuiting between the PINs led out after the tapes are cut off and the housing.

DESCRIPTION OF THE EMBODIMENTS

In order to make the technical means, creative features, objectives and effects of the present invention easy to understand, the present invention will be further explained below in conjunction with specific embodiments.

Referring to FIG. 1 to FIG. 6, a voice coil motor base according to the present invention includes a base body 10 and two electrode terminals 20 disposed on one side edge of the base body 10. The voice coil motor base further includes a molding tape embedded in the base body 10, and the molding tape is connected to the flat electrode terminals 20. The molding tape is provided with pins, and the pins connected with a circuit are disposed inside a voice coil motor.

Figure 1:
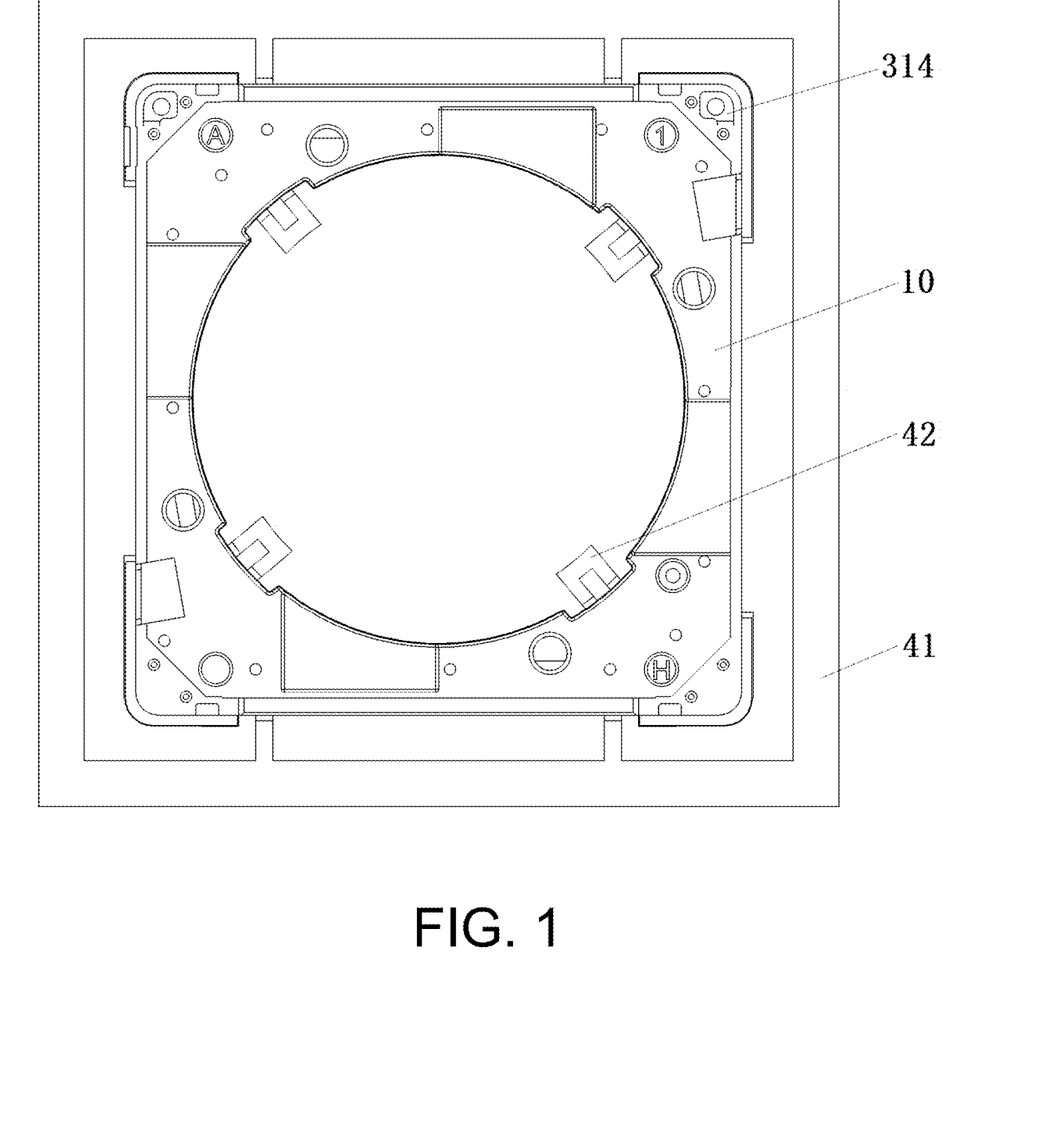
FIG. 1 is a schematic structural diagram of a voice coil motor base according to a first embodiment of the present invention.
Figure 2:
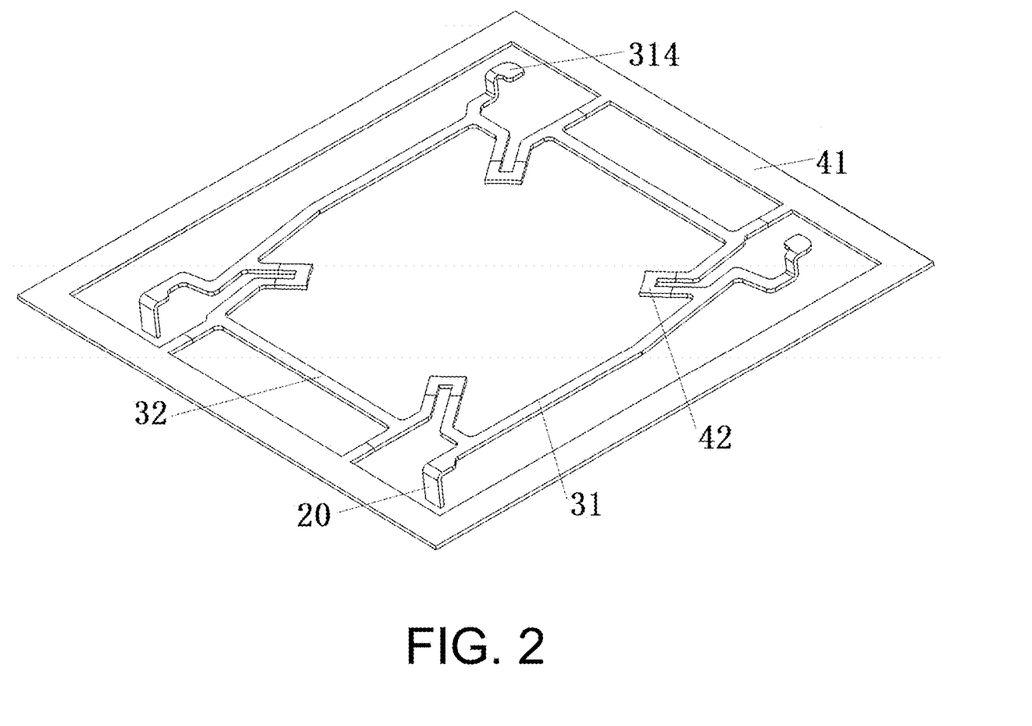
FIG. 2 is a schematic structural diagram of a molding tape and a scrap tape according to the present invention.

The pins are formed at joints of the molding tape and a scrap tape during processing.

Figure 3:
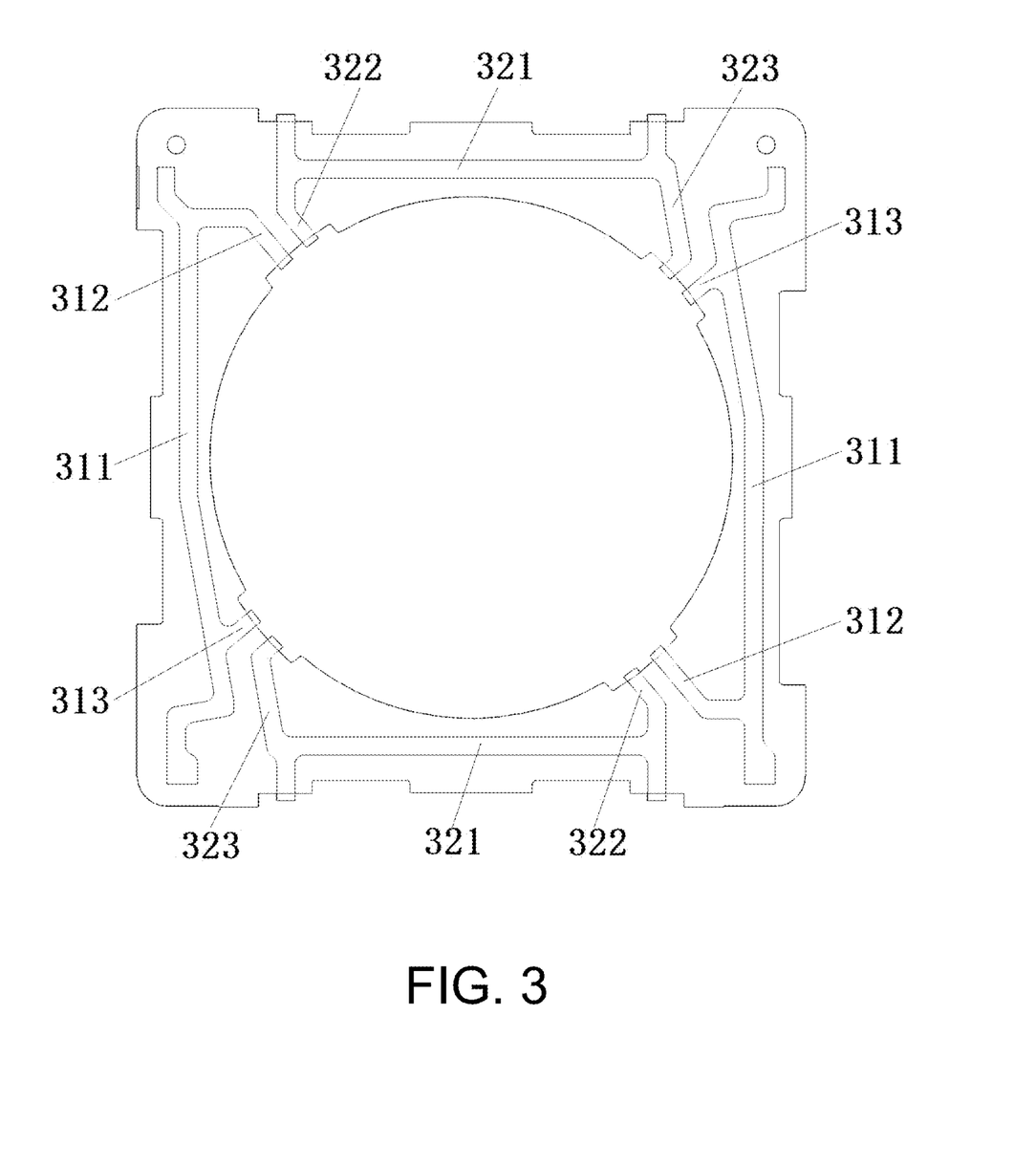
FIG. 3 is a cross-sectional view of a base body and a molding tape according to the present invention.

The electrode terminals 20 are disposed perpendicular to the molding tape, one end of each of the electrode terminals 20 is disposed in the base body 10, and the other end of each of the electrode terminals 20 extends in a height direction of the base body 10 and protrudes downward from the base body 10.

The molding tape includes main tapes 31 and auxiliary tapes 32 connected to the scrap tape, and the pins led out after the joints between the main tapes 31 and the scrap tape are cut are disposed inside the voice coil motor and connected to the circuit.

There are two main tapes 31 respectively and symmetrically disposed on left and right sides in the base body 10, and there are two auxiliary tapes 32 respectively and symmetrically disposed on front and rear sides in the base body 10. The two electrode terminals 20 are respectively connected to the two main tapes 31. The scrap tape includes an outer ring scrap tape 41 and an inner ring scrap tape 42. The main tapes 31 and the adjacent auxiliary tapes 32 are connected by the inner ring scrap tape 42. The middle part of the base body 10 is provided with a through hole, and the inner ring scrap tape 42 is disposed in the through hole. The pins led out after the joints between the main tapes 31 and the inner ring scrap tape 42 are cut are connected to the circuit. The outer ring scrap tape 41 is disposed on the outer side of the base body 10, and the outer sides of the auxiliary tapes 32 are connected to the outer ring scrap tape 41.

The main tape 31 includes a main tape body 311, and a first tape 312 and a second tape 313 that are connected to the inner side surface of the main tape body 311. An end of the first tape 312 and an end of the second tape 313 form the pins connected to the circuit. The electrode terminal 20 is integrally formed with an end of the main tape body 311, and the electrode terminal 20 is formed by bending the end of the main tape 31 downward and is perpendicular to the main tape 31. The other end of the main tape body 311 is provided with a flat soldering pad 314, and the soldering pad 314 is bonded to the end surface of the base body 10.

The auxiliary tape 32 includes an auxiliary tape body 321, and a third tape 322 and a fourth tape 323 that are connected to the inner side surface of the auxiliary tape body 321. The first tape 312 is connected to the third tape 322 on the corresponding side, and the second tape 313 is connected to the fourth tape 323 on the corresponding side.

In order to adapt to the reasonable arrangement of internal components of the voice coil motor, the shapes of the main tape body 311, the first tape 312, the second tape 313, the auxiliary tape body 321, the third tape 322 and the fourth tape 323 may be adjusted according to the specific circuit layout, that is, each tape may be of a flat strip structure or arc-shaped or a number of tapes are spliced into a strip structure. The inner ring scrap tape 42 may be of a U-shaped structure or a strip structure, as long as the structure can connect the main tape 31 and the auxiliary tape 32.

During processing, the molding tape and the scrap tape are integrated. The tapes are made of metal. The tapes are installed in a mold for injection molding. The plastic base body 10 formed by plastic and the tapes form an integrated structure, which facilitates processing. After the injection molding is completed, the scrap tape and the molding tape are cut off, and the auxiliary tape bodies 321 are cut from the outer ring scrap tape 41. Two ends of the inner ring scrap tape 42 are separated from the corresponding first tapes 312, second tapes 313, third tapes 322 or fourth tapes 323 by cutting, so that the tapes are cut from the inside to the outside, and the pins connected to the circuit are inside the voice coil motor. At this time, the pins on the first tapes 312 and the second tapes 313 are inside the voice coil motor. Although the cut pins on the auxiliary tapes 32 are outside the voice coil motor and are in contact with a housing 60, the auxiliary tapes 32 are not charged, so the risk of short-circuiting with the housing 60 is well avoided.

Second Embodiment

Figure 4:
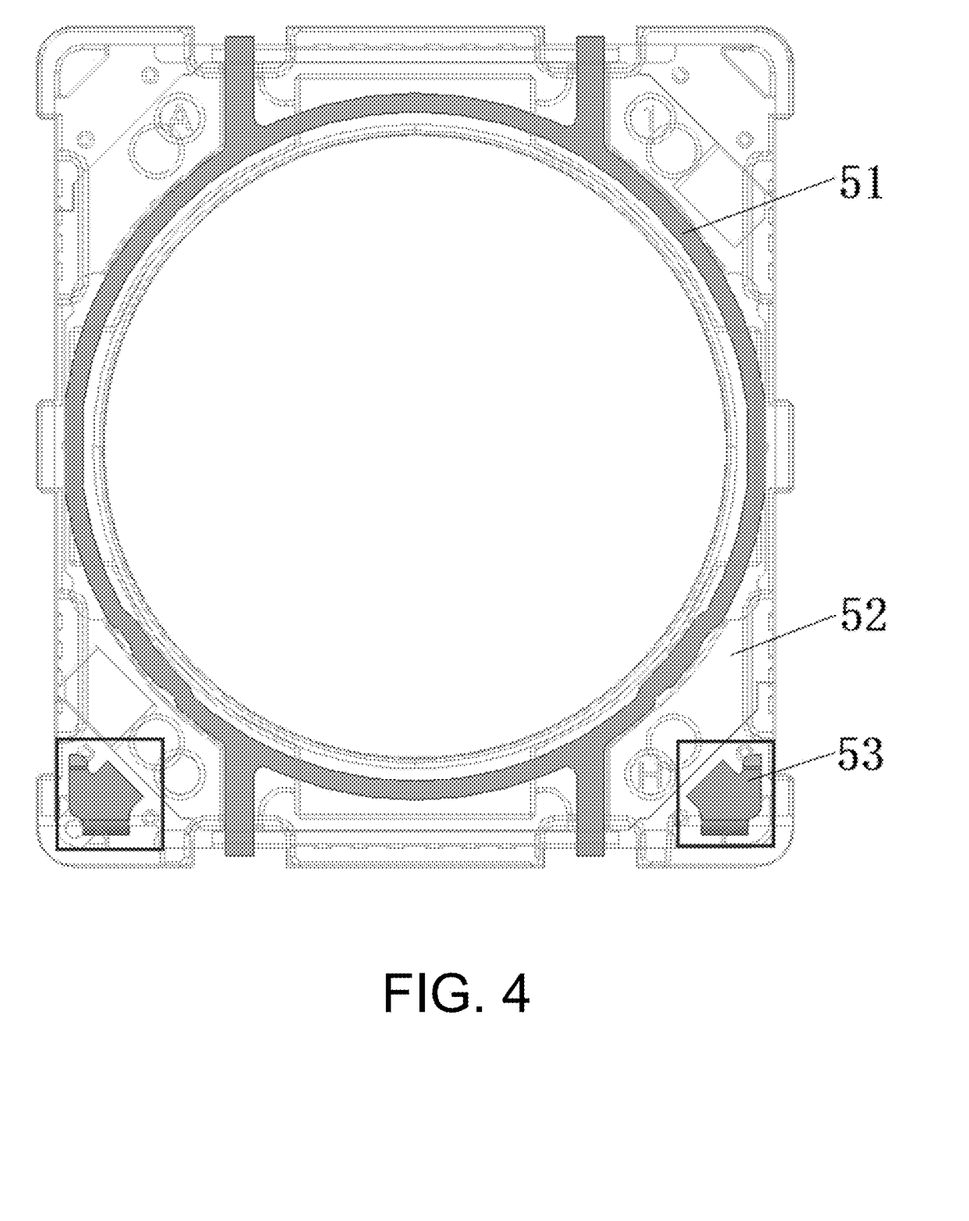
FIG. 4 is a schematic structural diagram of a voice coil motor base according to a second embodiment of the present invention.

In order to avoid short-circuiting between the pins connected to the circuit and the housing 60, the tapes and the electrode terminals may also be designed as separate structures. The outer wall of a second molding tape 51 is connected with a rectangular frame-type second scrap tape (not shown in the figures), the annular second molding tape is formed in a second base body 52 by injection molding, and one end of a second electrode terminal 53 is fixedly inserted into the second base body 52.

Embodiment of Camera Module

Figure 5:
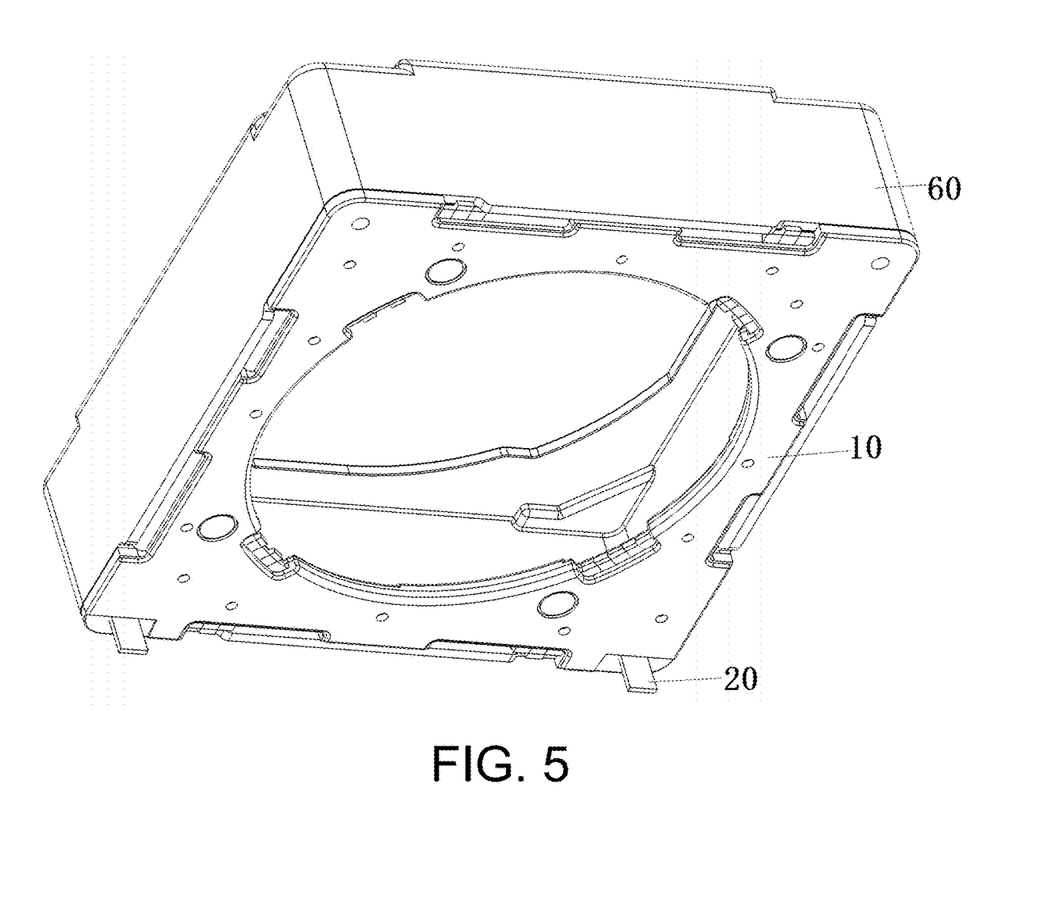
FIG. 5 is a schematic structural diagram of a voice coil motor according to the present invention.
Figure 6:
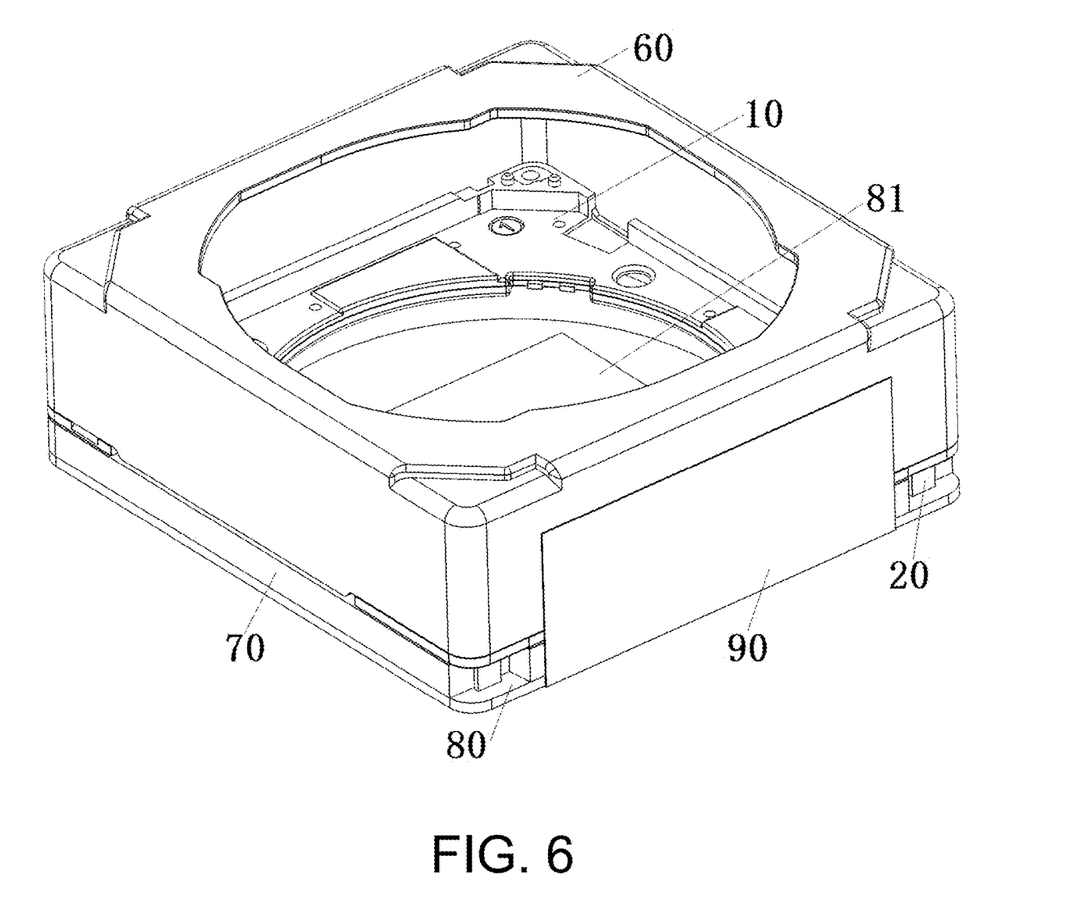
FIG. 6 is a schematic structural diagram of a camera module according to the present invention.

The present invention further provides a voice coil motor having the voice coil motor base as described in the first or second embodiment above. In addition, the present invention further provides a camera module having the voice coil motor as described above. The base body 10 is a frame-type member, and the base body 10 is buckled on an open end of the housing 60, so that an accommodating cavity is formed between the base body 10 and the housing 60. A lens is installed in the voice coil motor, the voice coil motor is fixed on a holder 70, the holder 70 is installed on a circuit board 80, the circuit board 80 in the holder 70 is provided with an image sensor 81, and the image sensor 81 is electrically connected to the circuit board 80. The electrode terminals 20 include a positive terminal and a negative terminal. The two electrode terminals 20 are electrically connected to the circuit board to provide high and low levels for driving the voice coil motor to operate. The base body 10, the holder 70 and the circuit board 80 are connected by a module conductive adhesive tape 90.

The basic principles, main features and advantages of the present invention are shown and described above. Those skilled in the art should understand that the present invention is not limited by the above embodiments, the above embodiments and the description only illustrate the principles of the present invention, the present invention will have various changes and improvements without departing from the spirit and scope of the present invention, and these changes and improvements all fall within the scope of the present invention. The scope of the present invention is defined by the appended claims and equivalents thereof.

What is claimed is:

1. A voice coil motor base, comprising a base body, two electrode terminals disposed on one side edge of the base body, and a molding tape embedded in the base body, wherein the molding tape is connected to the electrode terminals, the molding tape is provided with pins formed at joints of the molding tape and a scrap tape, and the pins connected to a circuit are disposed inside a voice coil motor.

2. The voice coil motor base according to claim 1, wherein the electrode terminals are disposed perpendicular to the molding tape, one end of each of the electrode terminals is disposed in the base body, and the other end of each of the electrode terminals extends in a height direction of the base body and protrudes downward from the base body.

3. The voice coil motor base according to claim 1, wherein the molding tape comprises main tapes and auxiliary tapes connected to the scrap tape, and the pins led out after joints between the main tapes and the scrap tape are cut are disposed inside the voice coil motor and connected to the circuit.

4. The voice coil motor base according to claim 3, wherein the two main tapes are provided and are respectively and symmetrically disposed on left and right sides in the base body, the two auxiliary tapes are provided and are respectively and symmetrically disposed on front and rear sides in the base body, and the two electrode terminals are respectively connected to the two main tapes; the scrap tape comprises an outer ring scrap tape and an inner ring scrap tape, each of the main tapes and an adjacent one of the auxiliary tapes are connected by the inner ring scrap tape, a middle part of the base body is provided with a through hole, the inner ring scrap tape is disposed in the through hole, and the pins led out after joints between the main tapes and the inner ring scrap tape are cut are connected to the circuit; the outer ring scrap tape is disposed on an outer side of the base body, and outer sides of the auxiliary tapes are connected to the outer ring scrap tape.

5. The voice coil motor base according to claim 4, wherein each of the main tapes comprises a main tape body, and a first tape and a second tape that are connected to an inner side surface of the main tape body, an end of the first tape and an end of the second tape form the pins connected to the circuit, and the electrode terminal is integrally formed with an end of the main tape body; each of the auxiliary tapes comprises an auxiliary tape body, and a third tape and a fourth tape that are connected to an inner side surface of the auxiliary tape body; the first tape is connected to the third tape on a corresponding side, and the second tape is connected to the fourth tape on a corresponding side.

6. A voice coil motor, comprising the voice coil motor base according to claim 1.

7. A camera module, comprising the voice coil motor according to claim 6.

8. A voice coil motor base, comprising a base body, two electrode terminals disposed on one side edge of the base body, and a molding tape embedded in the base body, wherein the electrode terminals are disposed perpendicular to the molding tape, one end of each of the electrode terminals is disposed in the base body, and the other end of each of the electrode terminals extends in a height direction of the base body and protrudes downward from the base body; and the molding tape is connected to the electrode terminals, the molding tape is provided with pins, and the pins connected to a circuit are disposed inside a voice coil motor.

* * * * *